(12) United States Patent
Piercy et al.

(10) Patent No.: US 8,488,753 B2
(45) Date of Patent: *Jul. 16, 2013

(54) LOCATION BASED FORMAT SELECTION FOR INFORMATION SERVICES

(75) Inventors: Larry Piercy, St. Joseph, MO (US); Doug Pfau, Paolo, KS (US); Melissa Dawn Trinkler, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 130 days.

This patent is subject to a terminal disclaimer.

(21) Appl. No.: 12/971,364

(22) Filed: Dec. 17, 2010

(65) Prior Publication Data

US 2011/0086624 A1 Apr. 14, 2011

Related U.S. Application Data

(63) Continuation of application No. 11/482,698, filed on Jul. 6, 2006, now Pat. No. 7,885,393.

(51) Int. Cl.
*H04M 11/00* (2006.01)

(52) U.S. Cl.
USPC .................. 379/90.01; 379/83.05; 379/45

(58) Field of Classification Search
USPC .......... 379/90.01, 93.05, 93.06, 93.17, 93.24; 455/517, 519, 536.1, 557, 446, 445, 412.1
See application file for complete search history.

(56) References Cited

U.S. PATENT DOCUMENTS

| 7,219,123 B1* | 5/2007 | Fiechter et al. | 709/203 |
| 7,885,393 B1* | 2/2011 | Piercy et al. | 379/90.01 |
| 7,945,635 B2* | 5/2011 | Proidl | 709/217 |

* cited by examiner

*Primary Examiner* — Melur Ramakrishnaiah

(57) ABSTRACT

In a communication system, a wireless transceiver receives a request message from a caller system for an information service. The information service is associated with an Internet address and an image format. A control system determines a location of the caller system. The control system selects a text message format for the information service based on the location of the caller system. The control system transmits a setup message to the information service indicating the selected text message format. In some examples, the control system receives a text message from the information service responsive to the set-up message, and the wireless transceiver transfers the text message to the caller system.

20 Claims, 7 Drawing Sheets

LOCATION BASED FORMAT SELECTION FOR INFORMATION SERVICES

RELATED APPLICATIONS

This patent application is a continuation of patent application Ser. No. 11/482,698 that was filed on Jul. 6, 2006, is entitled "LOCATION BASED FORMAT SELECTION FOR INFORMATION SERVICES", and that is hereby incorporated by reference into this patent application.

BACKGROUND OF THE INVENTION

1. Field of the Invention

The invention relates to telecommunications, and in particular, to location based format selection for telecommunication information services.

2. Description of the Prior Art

Telecommunication service providers increasingly offer specialized dialing services to customers. For example, some providers offer customers information services related to particular events. A customer can dial a specialized phone number for an event and their provider will connect the customer to a service that provides information related to the event. A typical information service often times includes a media unit that plays out an audio information stream to a customer over a bearer connection. In such a case, the connection between the customer handset and the media unit requires a bandwidth amount similar to any comparative voice call. Information services for sporting events, such as auto races, have become very popular.

One drawback from the perspective of a service provider is that a large number of customers could call a single information service nearly simultaneously and from a single location. In the case of wireless telecommunications, a large volume of calls to an information service could overwhelm the portion of a wireless network serving the location.

In the prior art, one solution to the above problem is to temporarily increase wireless capacity at certain venues or locations around the time of a popular event. In this manner, the bandwidth will exist to service a large number of information service calls from a particular location, in addition to any regular voice calls. Unfortunately, provisioning and deploying temporary service equipment is expensive and inefficient. Regardless, the actual bandwidth demand could still exceed that provided by temporary equipment.

Another solution in the prior art is to block any call that could cause the total bandwidth in-use to exceed the bandwidth capacity of the network. However, blocking a call regardless of whether the call is a voice call or an information service call could result in customer dissatisfaction. In addition, monitoring the available bandwidth of a wireless network on a per-call basis could be overly onerous.

SUMMARY OF THE INVENTION

An embodiment of the invention helps solve the above problems and other problems by providing methods, systems, and software for providing information services in various formats, depending upon the location of a caller. In this manner, the delivery of an information service to a large number of callers within a particular geographical region or location could be optimized, rather than having to block calls or otherwise provide substandard service.

In an embodiment of the invention, a wireless transceiver receives a request message from a caller system for an information service. The information service is associated with an Internet address and an image format. A control system determines a location of the caller system. The control system selects a text message format for the information service based on the location of the caller system. The control system transmits a setup message to the information service indicating the selected text message format. In some embodiments, the control system receives a text message from the information service responsive to the set-up message, and the wireless transceiver transfers the text message to the caller system.

BRIEF DESCRIPTION OF THE DRAWINGS

The same reference number represents the same element on all drawings.

DETAILED DESCRIPTION OF THE PREFERRED EMBODIMENT

FIGS. 1-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
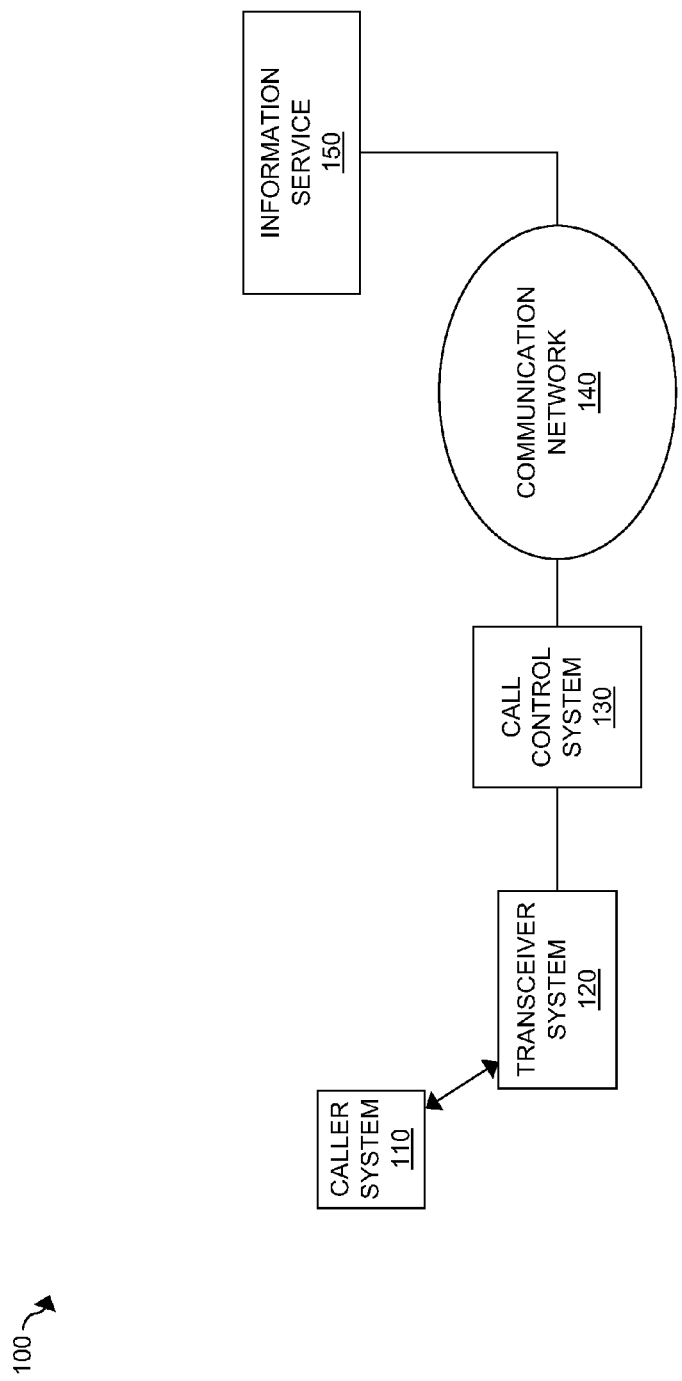
FIG. 1 illustrates a communication network in an embodiment of the invention.

FIG. 1 illustrates communication network 100 in an embodiment of the invention. Communication network 100 advantageously provides for the provisioning and delivery of information services in a manner that optimizes the overall performance of a communication network by selecting the format of an information service based on the location of a requesting party. Based on the location of the requesting party, an information service can be provided in an appropriate format so as not to overly burden a network or portion of a network utilized for the information service.

Referring to FIG. 1, communication network 100 includes caller system 110 in wireless communication with transceiver system 120. Transceiver system 120 is operatively coupled to call control system 130. Call control system 130 is operatively coupled to communication network 140. Information service 150 is also operatively coupled to communication network 140.

Caller system 110 could be any system or collection of systems capable of communicating with transceiver system 120, call control system 130, and information service 150. Caller system 110 could be, for example, a mobile phone, personal digital assistant (PDA), handheld computing device, or pager, as well as other types of caller systems.

Transceiver system 120 could be any system or collection of systems capable of transmitting and receiving wireless communications to and from caller system 110. In addition, transceiver system 120 could be any system or collection of systems capable of communicating with call control system 130. In an example, transceiver system 120 could be a wireless base station or base transceiver station.

Call control system 130 could be any system or collection of systems capable of controlling sessions or calls placed to or from caller system 110. Call control system 130 could be capable of communicating with transceiver system 120 and information service 150. In an example, call control system 130 could comprise a base station controller, a mobile switching center, a switch, or a soft switch, or any combination thereof, as well as any other type of call control system.

Communication network 140 could be any network or collection of networks capable of transporting communications to and from caller system 110, transceiver system 120, call control system 130, and information service 150.

Information service 150 could be any system or collection of systems capable of providing an information service to caller system 110. In an example, information service 150 could be a call server, as well as other types of platforms capable of providing information services.

In operation, a user could operate caller system 110 to initiate a session with information service 150. For example, a user providing an input to caller system 110 associated with information service 150, such as a telephone number, an Internet address, or the like. In such a case, caller system 110 could communicate via transceiver system 120 with call control system 130 to setup the session with information service 150. The user and caller system 110 could be located in a specific geographic location.

Call control system 130 could communicate a setup process with information service 150 to establish the session between caller system 110 and information service 150. Once the session has been established, information service 150 could be provided to the user.

Figure 2:
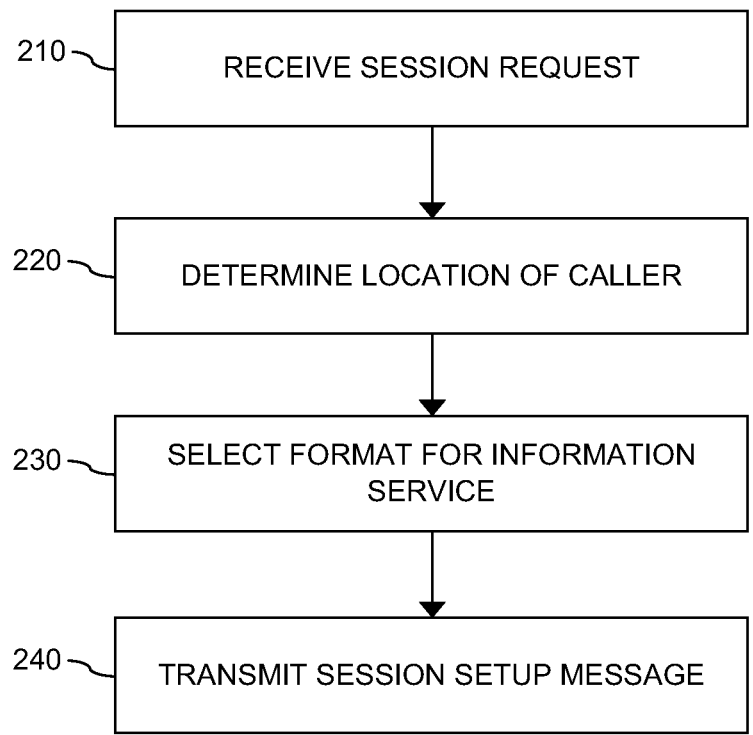
FIG. 2 illustrates the operation of a call control system in an embodiment of the invention.

FIG. 2 illustrates the operation of call control system 130. As discussed, the user and caller system 110 could be located in a specific geographic location. Upon receiving a session request from caller system 110 indicating information service 150 (Step 210), call control system 130 could determine the location of the caller and/or caller system 110 (Step 220). The location of the call could be determined in a number of well known ways, such as by a location indicator, a location determination method, as well as a location query.

Upon determining the location, call control system 130 could select a format from multiple formats for the requested information service 150 (Step 230). Next, call control system 130 could transmit a session setup message to information service 150 indicating the selected format (Step 240). In response, information service 150 could provide the requested service to caller system 110 in the selected format.

Figure 3:
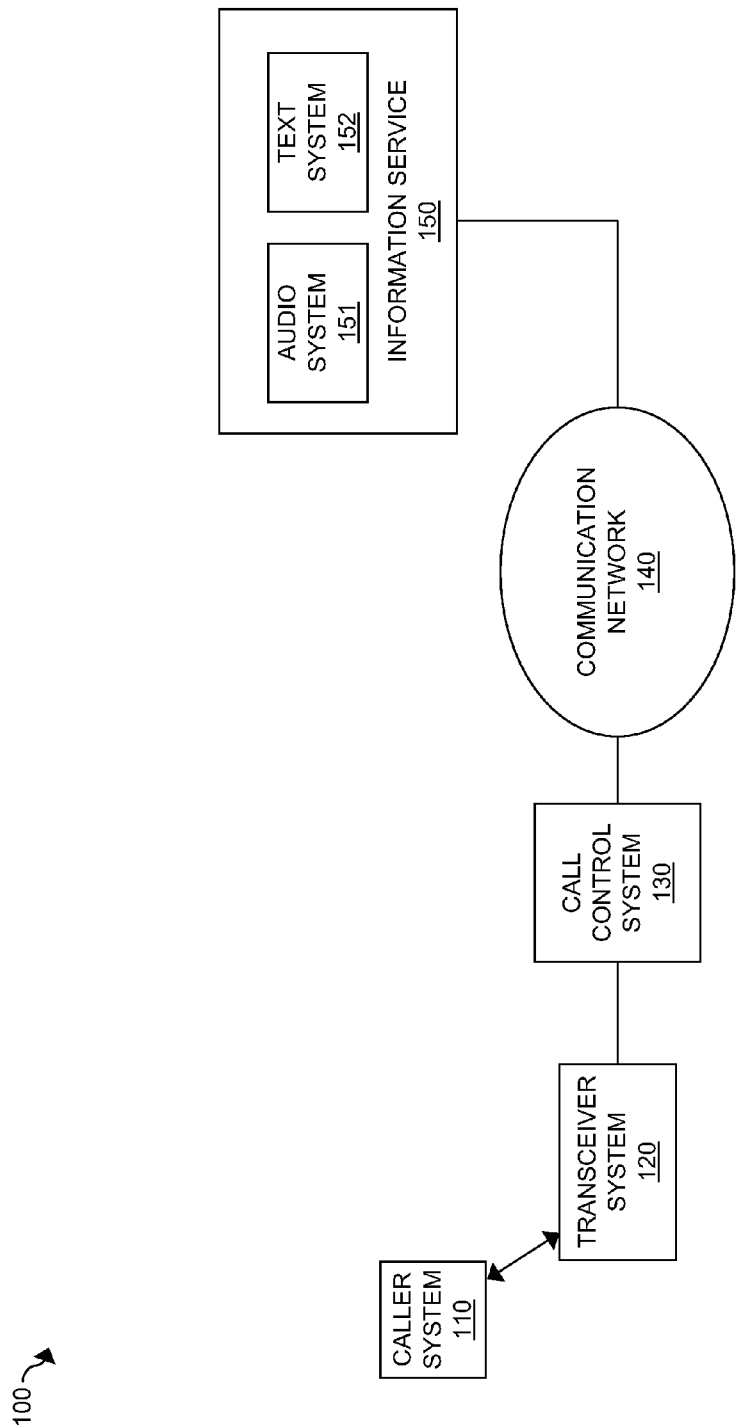
FIG. 3 illustrates a communication network in an embodiment of the invention.

FIG. 3 illustrates communication network 100 in another embodiment of the invention. In FIG. 3, information service 150 includes audio system 151 and text system 152. Audio system 151 could be any system or collection of systems capable of providing an information service to caller system 110 in an audio format. Text system 152 could be any system or collection of systems capable of providing an information service to caller system 110 in a text format. In one example, the text format could comprise a text messaging format.

It should be understood that other types of formats could be considered, such as video or picture image formats, as well as other types of formats. Likewise, other types of systems capable of providing an information service in the other types of formats could be considered, such as video systems or picture image systems.

In an operative example, caller system 110 could transmit a session request message to call control system 130 indicating information service 150. Based on the location of caller system 110, call control system 130 could select a format in which the information service could be provided to caller system 110. For example, call control system 130 could select from either an audio format or a text format. In such a case, audio system 151 could be selected to provide the information service in an audio format, whereas text system 152 could be selected to provide the information service in a text format.

In yet another operative example, a situation wherein a large number of callers place calls nearly simultaneously to an information service from a single geographic location or region, such as a sports stadium, could occur. In such an example, a call control system could determine based on the location of the callers that the requested information service be provided to the callers in a text format, rather than in an audio format, thereby conserving bandwidth in the geographic location or region.

Advantageously, communication network 100, and call control system 130 in particular, selects a format for a requested information service based on the location of caller system 110. In this manner, the information services can be provisioned and delivered in a manner that optimizes the overall performance of a communication network.

Figure 4:
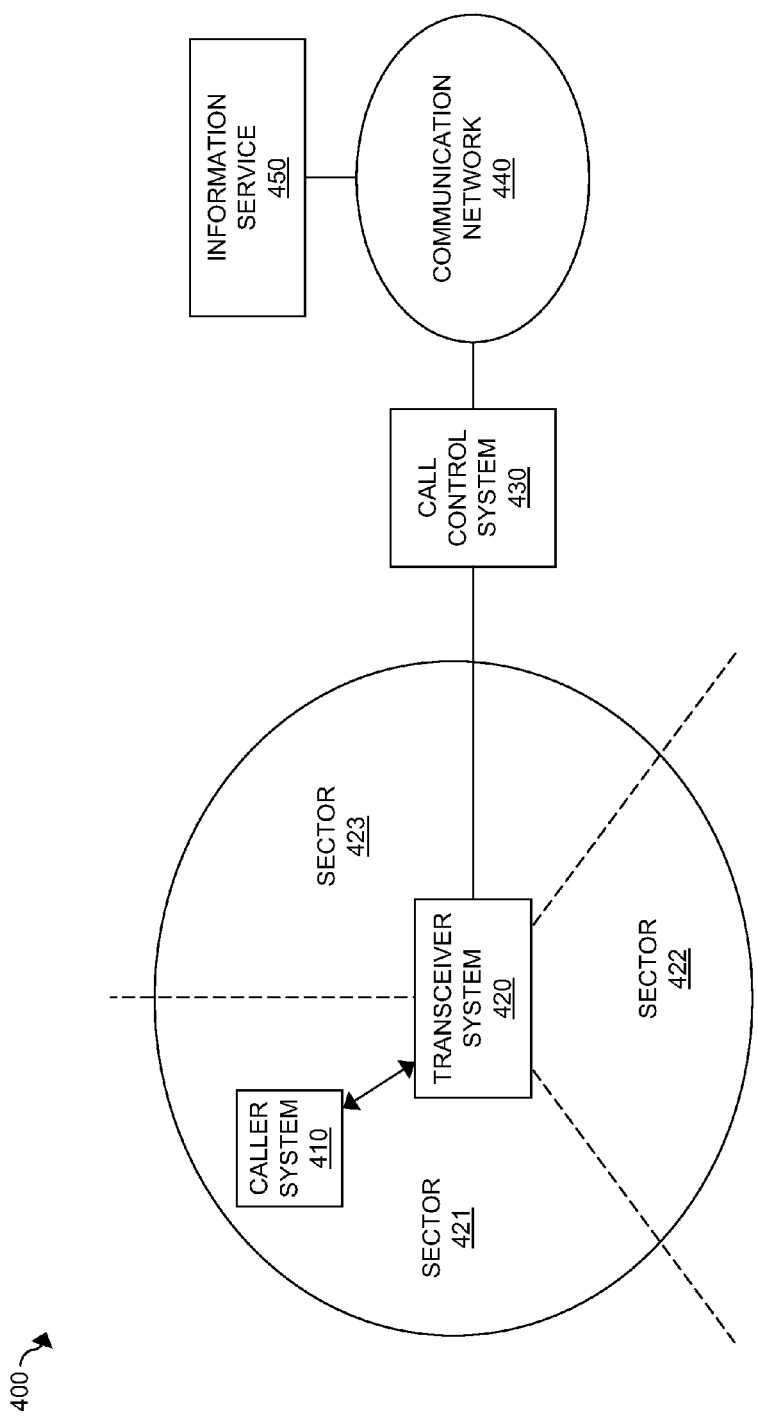
FIG. 4 illustrates a communication network in an embodiment of the invention.

FIG. 4 illustrates communication network 400 in an embodiment of the invention. Communication network 400 advantageously provides for the provisioning and delivery of information services in a manner that optimizes the overall performance of a communication network by selecting the format of an information service based on the wireless sector of a requesting party. Based on the wireless sector of the requesting party, an information service can be provided in an appropriate format so as not to overly burden a network or portion of a network utilized for the information service.

Referring to FIG. 4, communication network 400 includes caller system 410 in wireless communication with transceiver system 420. Transceiver system 420 is operatively coupled to call control system 430. Call control system 430 is operatively coupled to communication network 440. Information service 450 is also operatively coupled to communication network 440.

Caller system 410 could be any system or collection of systems capable of communicating with transceiver system 420, call control system 430, and information service 450. Caller system 410 could be, for example, a mobile phone, personal digital assistant (PDA), handheld computing device, or pager, as well as other types of caller systems.

Transceiver system 420 could be any system or collection of systems capable of transmitting and receiving wireless communications to and from caller system 410. In addition, transceiver system 420 could be any system or collection of systems capable of communicating with call control system 430. In an example, transceiver system 420 could be a wireless base station or base transceiver station.

It should be understood that transceiver system 420 could include multiple sub-systems wherein each sub-system could be capable of receiving communications from wireless sectors 421, 422, and 423 respectively. In an example, the sub-systems could comprise directional antennae, each antenna pointing in a different direction. As illustrated by FIG. 4, transceiver system 420 could include three sub-systems, wherein each sub-system could communicate with caller systems in three one-hundred twenty degree sectors respectively.

In an example, each sub-system could both transmit and receive communications. In an alternative, each sub-system could receive communications, while a central transmit sub-system could transmit communications. Other variations are possible.

Call control system 430 could be any system or collection of systems capable of controlling sessions or calls placed to or from caller system 410. Call control system 430 could be capable of communicating with transceiver system 420 and information service 450. In an example, call control system 430 could comprise a base station controller, a mobile switching center, a switch, or a soft switch, or any combination thereof, as well as any other type of call control system.

Communication network 440 could be any network or collection of networks capable of transporting communications to and from caller system 410, transceiver system 420, call control system 430, and information service 450.

Information service 450 could be any system or collection of systems capable of providing an information service to caller system 410. In an example, information service 450 could be a call server, as well as other types of platforms capable of providing information services.

In operation, a user could operate caller system 410 to initiate a session with information service 450. For example, a user providing an input to caller system 410 associated with information service 450, such as a telephone number, an Internet address, or the like. In such a case, caller system 410 could communicate via transceiver system 420 with call control system 430 to setup the session with information service 450. As illustrated, the user and caller system 410 could be located in sector 421.

Call control system 430 could exchange setup communications with information service 450 to establish the session between caller system 410 and information service 450. Once the session has been established, information service 450 could be provided to the user.

Figure 5:
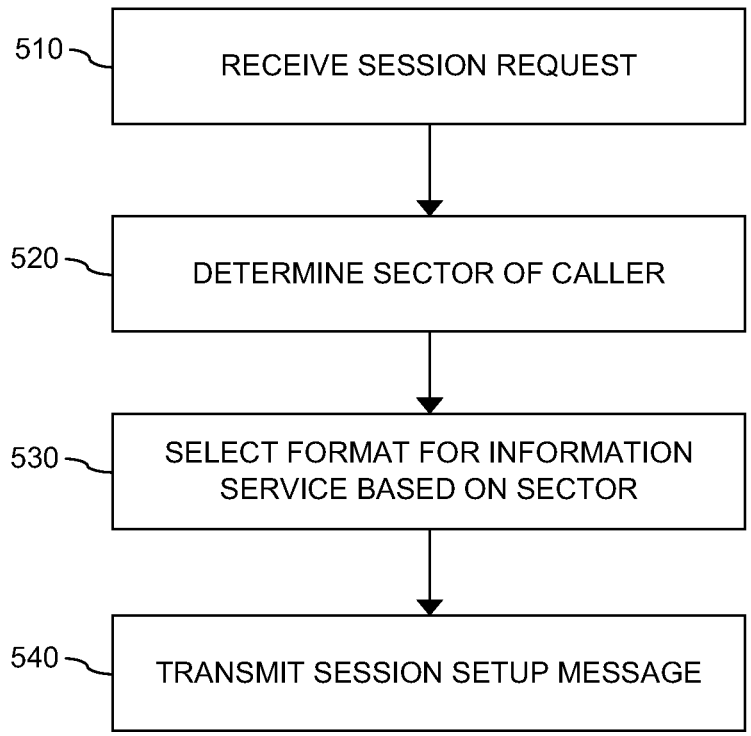
FIG. 5 illustrates the operation of a call control system in an embodiment of the invention.

FIG. 5 illustrates the operation of call control system 430. As discussed, the user and caller system 510 could be located in sector 421. Upon receiving a session request from caller system 410 indicating information service 450 (Step 510), call control system 430 could determine the location of the caller and/or caller system 410 (Step 520). The location of the call could be determined in a number of well known ways, such as by a sector indicator or flag included with communications received by transceiver system 420.

Upon determining the sector, call control system 430 could select a format from multiple formats for the requested information service 450 (Step 530). Next, call control system 430 could transmit a session setup message to information service 450 indicating the selected format (Step 540). In response, information service 450 could provide the requested service to caller system 410 in the selected format.

Advantageously, communication network 400, and call control system 430 in particular, selects a format for a requested information service based on the wireless sector of caller system 410. In this manner, the information services can be provisioned and delivered in a manner that optimizes the overall performance of a communication network.

Figure 6:
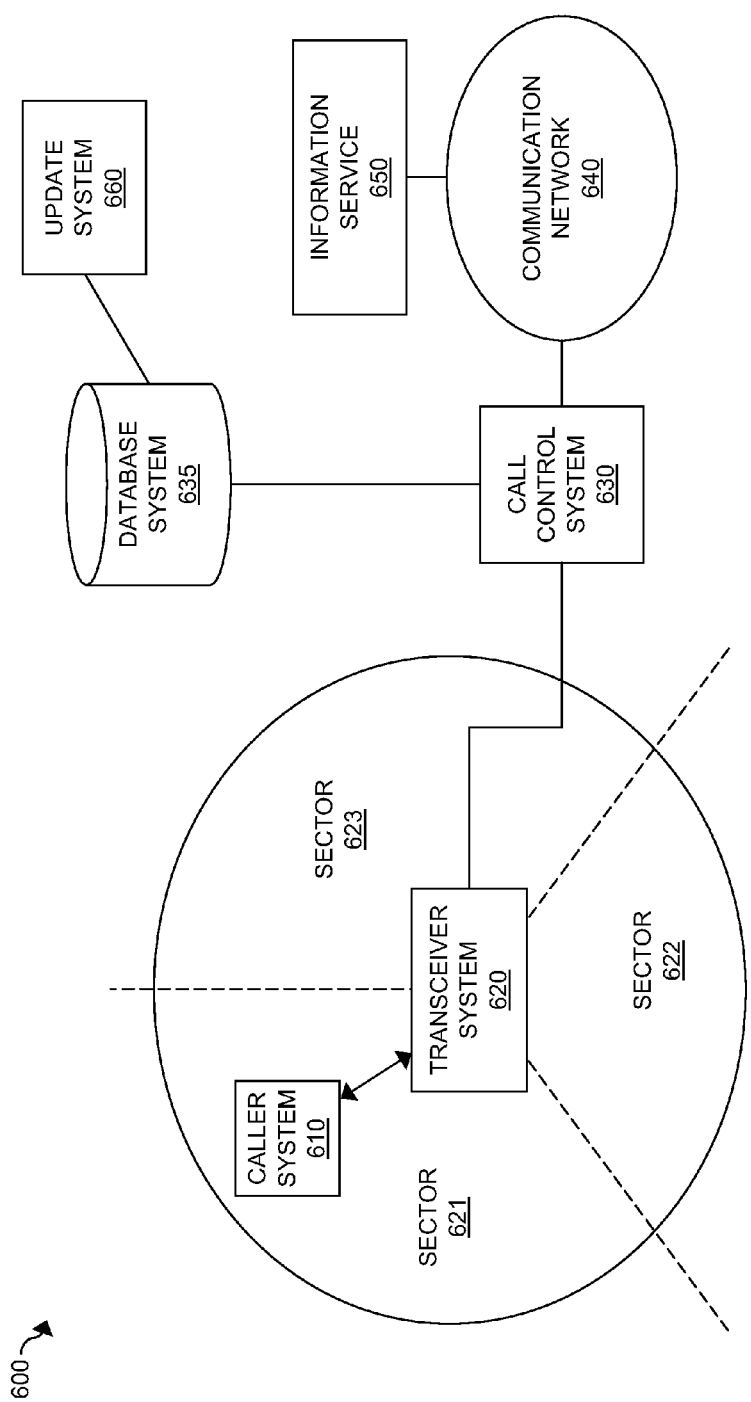
FIG. 6 illustrates a communication network in an embodiment of the invention.

FIG. 6 illustrates communication network 600 in an embodiment of the invention. Communication network 600 advantageously provides for the provisioning and delivery of information services in a manner that optimizes the overall performance of a communication network by selecting the format of an information service based on the wireless sector of a requesting party. Based on the wireless sector of the requesting party, an information service can be provided in an appropriate format so as not to overly burden a network or portion of a network utilized for the information service. In addition, communication network 600 provides a database system capable of storing format preferences in association with various wireless sectors. In an embodiment, the database system is remotely accessible by an update system.

Referring to FIG. 6, communication network 600 includes caller system 610 in wireless communication with transceiver system 620. Transceiver system 620 is operatively coupled to call control system 630. Call control system 630 is operatively coupled to communication network 640. Information service 650 is also operatively coupled to communication network 640. Communication network 600 also includes database system 635 and update system 660. Call control system 630 is in communication with database system 635. Likewise, update system 660 is in communication with database system 635.

Caller system 610 could be any system or collection of systems capable of communicating with transceiver system 620, call control system 630, and information service 650. Caller system 610 could be, for example, a mobile phone, personal digital assistant (PDA), handheld computing device, or pager, as well as other types of caller systems.

Transceiver system 620 could be any system or collection of systems capable of transmitting and receiving wireless communications to and from caller system 610. In addition, transceiver system 620 could be any system or collection of systems capable of communicating with call control system 630. In an example, transceiver system 620 could be a wireless base station or base transceiver station.

It should be understood that transceiver system 620 could include multiple sub-systems wherein each sub-system could be capable of receiving communications from wireless sectors 621, 622, and 623 respectively. In an example, the sub-systems could comprise directional antennae, each antenna pointing in a different direction. As illustrated by FIG. 6, transceiver system 620 could include three sub-systems, wherein each sub-system could communicate with caller systems in three one-hundred twenty degree sectors respectively. In an example, each sub-system could both transmit and receive communications. In an alternative, each sub-system could receive communications, while a central transmit sub-system could transmit communications. Other variations are possible.

Database system 635 could be any system or collection of systems capable of storing the identities of various sectors in association with the identities of various information services. In addition, database system 635 could be capable of storing preferred formats stored in association with the various sectors and information services. In one example, database system 635 could store the sector, information service, and format identities in translation tables. Translation tables are well known telecommunication database tables utilized for call routing. It should be understood that database system 635 could be independent of call control system 630. However, it should also be understood that database system 635 could be integrated with call control system 630.

Update system 660 could comprise any system or collection of systems capable of providing users with remote access and update capabilities for database system 635. For example, update system 660 could be configured to update database system 635 with changes to translations tables. Update system 660 could be a well known remote communication process, such as FTP or Telnet. Other processes are possible.

In an embodiment, users could update database system 635 in response to real-time events. For example, an event that could attract a large crowd could be scheduled within a relatively short notice period. The event could be scheduled at a venue within sector 621. In anticipation of the event, the owner or operator of communication network 600 could utilize update system 660 to update how requests for sessions with information service 650 are handled. Prior to the event schedule, requests from sector 621 could be handled normally. However, during the event service requests for information service 650 could be handled in an exception manner as prescribed by an update from update system 660.

Call control system 630 could be any system or collection of systems capable of controlling sessions or calls placed to or from caller system 610. Call control system 630 could be capable of communicating with transceiver system 620, information service 650, and database system 635. In an example, call control system 630 could comprise a base station controller, a mobile switching center, a switch, or a soft switch, or any combination thereof, as well as any other type of call control system.

Communication network 640 could be any network or collection of networks capable of transporting communications to and from caller system 610, transceiver system 620, call control system 630, and information service 650.

Information service 650 could be any system or collection of systems capable of providing an information service to caller system 610. In an example, information service 650 could be a call server, as well as other types of platforms capable of providing information services.

In operation, a user could operate caller system 610 to initiate a session with information service 650. For example, a user could provide an input to caller system 610 associated with information service 650, such as a dialed telephone number, an Internet address, or the like. In one example, the dialed telephone number could be a vertical service code, an abbreviated dialing code, or the like. In such a case, caller system 610 could communicate via transceiver system 620 with call control system 630 to setup the session with information service 650. As illustrated, the user and caller system 610 could be located in sector 621.

Call control system 630 could exchange setup communications with information service 650 and database system 635 to establish the session between caller system 610 and information service 650. Once the session has been established, information service 650 could be provided to the user.

In an operative example, call control system 630 could receive a session request from caller system 610. The session request could indicate the location of caller system 610 in sector 621. In one example, signaling from transceiver system 620 separate from the session request could indicate sector 621.

In response to the session request, call control system 630 could query database system 635 with the identity of the requested information service 650 and the location of caller system 610. In this case, the location is sector 621. Database system 635 could process the query with the translation tables and return a response to call control system 630 identifying a preferred format for the information service 650 with respect to requests originating from sector 621. The preferred format could be one format of multiple formats, such as audio, text, video, and picture formats.

Upon receiving the response from database system 635, call control system 630 could transmit a setup message to information service 650 identifying caller system 610 and the preferred format for the service. In response, information service 650 could provide the service in the preferred format. For example, an audio module in information service 650 could play-out an information stream to the user of caller system 610. In another example, a text messaging module could generate and transmit a single or series of text messages to caller system 610 for display to the user. Either the audio play-out or the text messages could include the information relevant to information service 650.

Advantageously, communication network 600, and call control system 630 in particular, selects a format for a requested information service based on the wireless sector of caller system 610. In this manner, the information services can be provisioned and delivered in a manner that optimizes the overall performance of a communication network.

Figure 7:
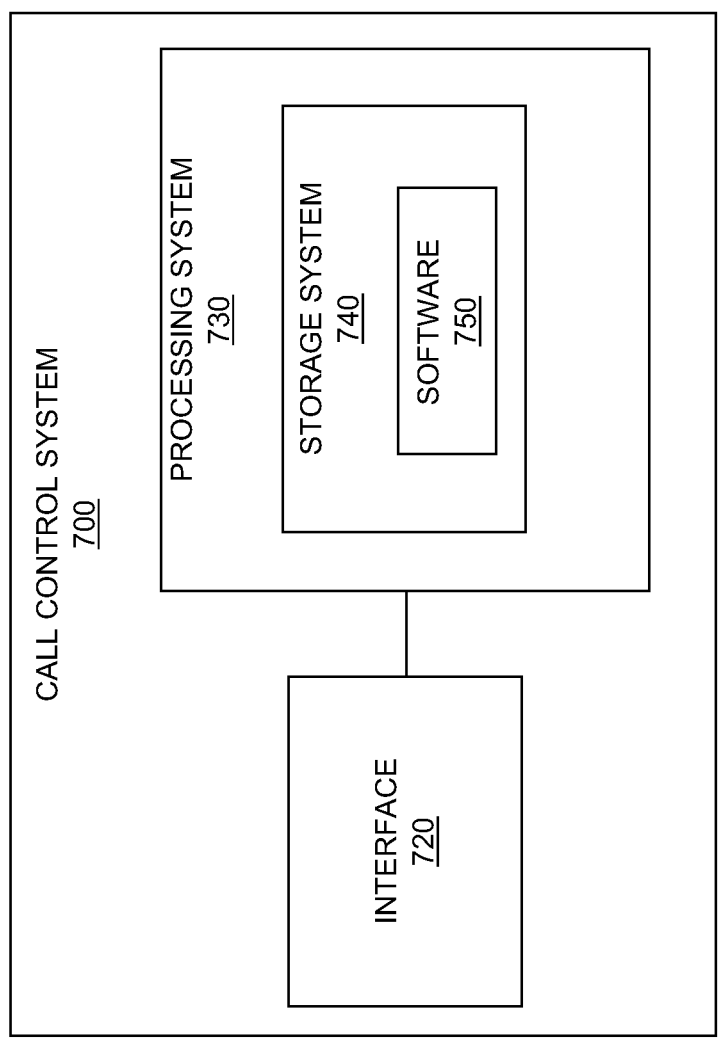
FIG. 7 illustrates a computer system in an embodiment of the invention.

FIG. 7 illustrates computer system 700 in an embodiment of the invention. Computer system 700 includes interface 720, processing system 730, storage system 740, and software 750. Storage system 740 stores software 750. Processing system 730 is linked to interface 720. Computer system 700 could be comprised of a programmed general-purpose computer, although those skilled in the art will appreciate that programmable or special purpose circuitry and equipment may be used. Computer system 700 may use a client server architecture where operations are distributed among a server system and client devices that together comprise elements 720-750.

Interface 720 could comprise a network interface card, modem, port, or some other communication device. Interface 720 may be distributed among multiple communication devices. Interface 730 could comprise a computer microprocessor, logic circuit, or some other processing device. Processing system 730 may be distributed among multiple processing devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a general-purpose computer. Software 750 could also comprise an application program, firmware, or some other form of machine-readable processing instructions. When executed by the processing system 730, software 750 directs processing system 730 to operate as described for call control systems 130, 430 and 630, as well as for other elements of communication networks 100, 400, and 600.

What is claimed is:

1. A method of operating a communication network, the method comprising:
   wirelessly receiving a request message from a caller system for an information service that is associated with an Internet address and an image format;
   determining a location of the caller system;
   selecting a text message format for the information service based on the location of the caller system; and
   transmitting a setup message to the information service indicating the selected text message format.

2. The method of claim 1 further comprising receiving a text message from the information service responsive to the set-up message and transferring the text message to the caller system.

3. The method of claim 1 wherein the location comprises a wireless sector including the caller system.

4. The method of claim 1 wherein the location is associated with a crowded event and wherein selecting the text message format for the information service based on the location of the caller system further comprises selecting the text message format during the event but not selecting the text message format before and after the event.

5. The method of claim 1 wherein selecting the text message format for the information service based on the location of the caller system comprises querying a database with the location and receiving a response indicating the text message format.

6. The method of claim 5 wherein querying the database with the location further comprises querying the database with the information service.

7. The method of claim 6 further comprising, in the database, translating the location and the information service into the text message format indication.

8. The method of claim 7 further comprising updating the database to associate the location and the information service with the text message format.

9. The method of claim 8 further comprising updating the database in response to an event associated with the location.

10. The method of claim 1 wherein the caller system comprises a mobile telephone.

11. A communication system comprising:
a wireless transceiver configured to wirelessly receive a request message from a caller system for an information service that is associated with an Internet address and an image format; and
a control system configured to determine a location of the caller system, select a text message format for the information service based on the location of the caller system, and transmit a setup message to the information service indicating the selected text message format.

12. The communication system of claim 11 wherein the control system is configured to receive a text message from the information service responsive to the set-up message and the wireless transceiver is configured to wirelessly transfer the text message to the caller system.

13. The communication system of claim 11 wherein the location comprises a wireless sector including the caller system.

14. The communication system of claim 11 wherein the location is associated with a crowded event and the control system is configured to select the text message format for the information service based on the location of the caller system during the event but not to select the text message format before and after the event.

15. The communication system of claim 11 wherein the control system comprises a database and the control system is configured to query the database with the location and receive a response indicating the text message format.

16. The communication system of claim 15 wherein the control system is configured to query the database with the information service.

17. The communication system of claim 16 wherein the database is configured to translate the location and the information service into the text message format indication.

18. The communication system of claim 17 further comprising an update system configured to update the database to associate the location and the information service with the text message format.

19. The communication system of claim 18 wherein the update system is configured to update the database in response to an event associated with the location.

20. The communication system of claim 11 wherein the caller system comprises a mobile telephone.

* * * * *